CELLULAR UREA FORMALDEHYDE RESIN PELLETS THEREOF, AND METHOD FOR MAKING THE SAME

Filed Oct. 23, 1963

INVENTOR:
THOMAS A. PILGRIM
BY
Browne, Schuyler & Beveridge
ATTORNEYS

INVENTOR:
THOMAS A. PILGRIM
BY
Browne, Schuyler & Beveridge
ATTORNEYS

United States Patent Office 3,329,631

Patented July 4, 1967

3,329,631

CELLULAR UREA FORMALDEHYDE RESIN, PELLETS THEREOF, AND METHOD FOR MAKING THE SAME

Thomas Albert Pilgrim, Nottingham, England, assignor to The British Plaster Board (Holdings) Limited, London, England Filed Oct. 23, 1963, Ser. No. 318,432
Claims priority, application Great Britain, Nov. 1, 1962, 41,314/62
20 Claims. (Cl. 260—2.5)

The present invention relates to cellular synthetic resins which are normally prepared by foaming liquid resin and is particularly applicable to cured cellular urea-formaldehyde resins, hereinafter called U/F resin.

U/F resin is by far the cheapest of all commercially available synthetic resins being many times cheaper than polystyrene, which in its cellular form is at the present time a very widely used resin. However, in contrast to polystyrene, U/F resin is extremely difficult to manufacture in satisfactory cellular form and the cellular product is liable to be extremely friable. It has therefore had very limited commercial application. In view of the relative cheapness of the U/F resin in liquid form, attempts have been made to stabilize or plasticize the cellular resin by the addition of other resins such as vinyl and acrylic resins. These resins are however relatively expensive materials and thus the cost of plasticized and stabilized cellular U/F resin is considerable. Further, plasticized and sta bilized cellular U/F resins have apparently not been found to be very satisfactory since industry still largely uses other cellular resins in preference to them. So far as we are aware, it has not to date proved commercially practicable to produce, continuously and inexpensively, cellular U/F resin which has been other than crumbly or friable.

The object of the present invention is to provide a cellular U/F resin which is not crumbly or friable.

The present invention resides in the concept of making the cell walls of cellular U/F resin thin enough to render them sufficiently resilient or flexible to enable them to accommodate themselves to contraction of the resin on hardening and thus to avoid undue incidence of fracture or collapse thereof on hardening after gelation.

The present invention therefore comprises a cellular U/F resin in which the cells thereof are so thin that the average bulk of solid between the cells does not exceed that which obtains when the total volume of the solid resin per unit volume of the cellular resin is 2.2% and the average number of cells per cubic centimetre is $10^6$. The cells are desirably of uniform size and shape.

The above criterion for the maximum percentage volume of the solid resin in the cellular product per unit volume for a particular cell size determines the maximum average wall thickness within the cellular product. This maximum average wall thickness is the same for all sizes of cells, whether they be for example $10^4$ cells per cubic centimetre or $10^7$ cells per cubic centimetre. Due to the extreme thinness of the cell walls and the non-uniformity thereof it is impracticable to give a maximum wall thickness. However the above criterion provides two determinable values, the number of cells uer unit volume being determinable experimentally with the aid of a stereoscopic binocular microscope and the total volume of solid resin per unit volume of the cellular product being the ratio of the specific gravity of the cellular resin to the specific gravity of the solid resin.

The actual maximum figure of 2.2% for the total volume of the solid resin per unit volume of the cellular resin only relates to the average of $10^6$ cells per unit volume, the figure increasing as the number of cells per unit volume increases due to the surface area of the cell wall per unit volume increasing and vice versa. It will be seen that generally the total surface area of the cell walls per unit volume of cellular resin increases ten-fold as the number of cells increases a thousand-fold per unit volume and thus for a cellular resin having $10^3$ cells per unit volume the maximum figure would be 0.22%, whereas for a cellular resin having $10^9$ cells per unit volume the maximum figure would be 22% for the total volume of solid resin per unit volume of the cellular resin.

It has been found that from a practical point of view the minimum number of cells in the cellular U/F resin per unit volume should be at least $10^4$ and even with this number of cells per unit volume, the thickness of the cell walls for the specific gravity of cellular products practically obtainable would be near their maximum. Thus, with cellular U/F resins having $10^4$ cells per unit volume, due to the thickness of the cell walls the flexibility of the cell walls while hardening is at a minimum.

If, on the other hand, the resin were to have as many as $10^9$ cells per unit volume, then the cellular resin would have a total volume of solid resin per unit volume of cellular resin of about 22%. This allows great latitude for the choice of specific gravity of the cellular resin. For a constant specific gravity of the cellular resin, the larger the number of cells per unit volume the thinner will be the cell walls and thus the stronger the final products.

A correlation between the number of cells per unit volume of the cellular resin and the maximum total volume of solid resin per unit volume of the cellular resin is given in the following table.

*Table 1*

| Number of cells per unit volume of cellular U/F resin: | Maximum total volume of solid U/F resin per unit volume of cellular U/F resin, percent |
|---|---|
| $10^4$ | 0.5 |
| $10^5$ | 1.0 |
| $10^6$ | 2.2 |
| $10^7$ | 4.8 |
| $10^8$ | 10.6 |
| $10^9$ | 22.0 |

The cellular U/F resin desirably has an average bulk of solid between the cells which is not greater than that which obtains when a total volume of solid U/F resin per unit volume of the cellular U/F resin is not greater than 1.1% and the average number of cells per cubic centimetre is $10^6$. A correlation of number of cells per unit volume of the cellular U/F resin and the maximum total volume of solid U/F resin per unit volume of the cellular U/F resin is given in the following table.

*Table 2*

| Number of cells per unit volume of cellular U/F resin: | Maximum total volume of solid U/F resin per unit volume of cellular U/F resin, percent |
|---|---|
| $10^4$ | 0.24 |
| $10^5$ | 0.50 |
| $10^6$ | 1.10 |
| $10^7$ | 2.40 |
| $10^8$ | 5.30 |
| $10^9$ | 11.00 |

The cellular U/F resin more desirably has an average bulk of solid between the cells which is not greater than that which obtains when a total volume of solid U/F resin per unit volume of the cellular U/F resin is not greater than 0.55% and the average number of cells per cubic centimetre is $10^6$. A correlation of number of cells per unit volume of cellular U/F resin and the maximum total volume of solid U/F resin is given in the following table:

*Table 3*

| Number of cells per unit volume of cellular U/F resin: | Maximum total volume of solid U/F resin per unit volume of cellular U/F resin, percent |
|---|---|
| $10^4$ | 0.12 |
| $10^5$ | 0.25 |
| $10^6$ | 0.55 |
| $10^7$ | 1.20 |
| $10^8$ | 2.60 |
| $10^9$ | 5.50 |

Further it is in many cases desirable that the cellular U/F resin has an average bulk of solid between the cells which is not greater than that which obtains when a total volume of solid U/F resin per unit volume of the cellular U/F resin is not greater than 0.28% and the average number of cells per cubic centimetre is $10^6$. A correlation of number of cells per unit volume of the cellular U/F resin and the maximum total volume of solid U/F resin per unit volume of the cellular U/F resin is given in the following table:

*Table 4*

| Number of cells per unit volume of cellular U/F resin: | Maximum total volume of solid U/F resin per unit volume of cellular U/F resin, percent |
|---|---|
| $10^4$ | 0.06 |
| $10^5$ | 0.13 |
| $10^6$ | 0.28 |
| $10^7$ | 0.60 |
| $10^8$ | 1.30 |
| $10^9$ | 2.70 |

The cellular U/F resin may have an average bulk of solid between the cells which is not greater than that which obtains when a total volume of solid U/F resin per unit volume of the cellular U/F resin is not greater than 0.14% and the average number of cells per cubic centimetre is $10^6$. A correlation of number of cells per unit volume of the cellular U/F resin and the maximum total volume of solid U/F resin per unit volume of the cellular U/F resin is given in the following table:

*Table 5*

| Number of cells per unit volume of cellular U/F resin: | Maximum total volume of solid U/F resin per unit volume of cellular U/F resin, percent |
|---|---|
| $10^4$ | 0.03 |
| $10^5$ | 0.07 |
| $10^6$ | 0.14 |
| $10^7$ | 0.30 |
| $10^8$ | 0.65 |
| $10^9$ | 1.35 |

The resins of the present invention desirably have a porosity of not more than 9% volume when subjected to an absorption test in which a sample of the cellular U/F resin is submerged for 168 hours at ambient temperature and atmospheric pressure in a 0.1% solution of a surface active agent.

The foamed, U/F resins of the present invention may be prepared by a process which comprises in a first stage agitating a mixture of liquid U/F resin, foaming agent and water in the presence of air, the duration and intensity of agitation being sufficient to produce a fine foam in which there are at least an average of $10^4$, preferably $10^6$ and more preferably $10^7$ cells per cubic centimetre, the proportions of resin, foaming agent and water being gauged to provide the appropriate maximum percentage of the total volume of solid resin per unit volume of the cellular resin product as referred to above; in a second stage adding a hardening agent in an amount sufficient to harden all of said fine foam and continuing to agitate said fine foam up to a point before gelation of the resin, the intensity and duration of the continued agitation being sufficient to maintain the size of the cells on gelation.

Although it has been hitherto suggested that cellular ureaformaldehyde should be made so as to incorporate large numbers of relatively small cells such suggestions have not led to the satisfactory production of noncrumbly cellular ureaformaldehyde on an economical commercial scale. Cellular ureaformaldehyde containing large numbers of small cells per unit volume say for example $10^5$ or higher might still be of a crumbly character if the total volume of the solid resin per unit volume of the cellular resin were too great because too great a total volume of solid resin per unit volume of cellular resin would lead to too great a wall thickness between the cells and thus lack of that resilience of cell walls which is necessary to prevent friability in the finished product.

An important feature of the present invention therefore resides in mixing into the foam an amount of resin appropriate to the cell structure which it is desired to achieve i.e. appropriate to a product having an approximate predetermined number of cells per cubic centimetre, in foaming the resin mixture to a degree sufficient to achieve that cell structure prior to gelation and in maintaining the cell structure once achieved until gelation takes place.

The cellular foamed resin may be taken from the second stage of the process in bulk form or in a particularly desirable aspect of the present invention, the foam is discharged from the second stage and formed into pellets by subjecting it at the point of gelation to centrifugal action and/or to impact with a gas, such as air, which breaks up the foam into pellets which then harden. The pelletization of the foam at the point of gelation in the second stage is effected according to one embodiment of the invention by subjecting the foam to a plurality of jets of compressed air, suitably in the form of a ring which breaks up the foam into pellets, the size of which depends upon the air pressure and the angle of the jets and the pitch of the jet nozzles.

Preferably however the foamed resin is pelletized centrifugally for example by feeding the foamed resin to the space between a pair of opposed rotating cones, whose wider ends are adjacent to one another and spaced apart by only a narrow gap and allowing the foamed resin to be flung by centrifugal action through the narrow gap. The size of the pellets so formed will depend upon the width of the gap between the cones and the speed of rotation.

It is desirable in order to obtain a smaller and more uniformly graded pellet to subject the foamed resin on issuing from the narrow gap between the cones to the action of a plurality of jets of compressed air. To this end a plurality of jet nozzles conveniently in the form of a ring are disposed above the cones so that the air jets impinge on the foamed resin issuing from the narrow gap between the cones. The pellets so formed may be allowed to fall freely through a heated zone to harden and dry. The cones are preferably arranged with their axes vertical and the uppermost cone may have a duct extending upwardly therefrom which feeds foam from the second stage to the space between the cones.

From examination of dry pellets made according to the present invention it appears that the cells on the surface thereof have contracted and the resin has tended to migrate to the surface of the pellet, thus yielding a pellet which is essentially non-porous. If the temperature at which the pellets are dried is high enough the pellets that are obtained have a hollow core.

The present invention therefore provides an essentially non-porous pellet of cellular U/F resin, the cells on the exterior portions of which have an essentially closed cell structure, and have a smaller cell size than the cells of the interior portions thereof.

Desirably the size of the exterior cells is such that there are an average of at least $10^7$ preferably an average of at least $10^8$ and more preferably an average of at least $10^9$ cells per cubic centimetre.

The pellets of the present invention are extremely useful as aggregate in building materials such as cement and plaster in the manufacture of lightweight, heat and sound insulating building blocks, slabs and the like.

Referring both to the process for the production of the bulk material and of the pellets, the final specific gravity of the cellular U/F resin in bulk form for a particular cell size can be varied by varying the relative proportions of the liquid resin, foaming agent and water fed to the first stage of the process, the specific gravity of the cellular product tending to be lower, the more water there is present and higher the less water there is present. The specific gravity as aforesaid is related to the total volume of solid resin per unit volume of cellular product.

The process of the present invention may be effected on a batch basis but preferably it is effected on a continuous basis, this being especially desirable when the foamed resin is pelletized. Further, in order to obtain a foam of the appropriate cell size, the mixing is desirably effected mechanically and further the air is present under pressure, i.e. the whole system is pressurized. The pressure used depends upon the size of the apparatus. In a pilot apparatus a pressure of 40 pounds per square inch was found to be suitable.

It is desirable in order to avoid or minimise precipitation or pre-gelling of the U/F resin in the second stage to use resin which is substantially free from low molecular fractions and which affords a more precise point of gelation for the resin. This is especially desirable when the foam is to be pelletized before hardening since the pelletization occurs substantially at the point of gelation.

The foaming agent used may be any conventional foaming agent but is suitably a sodium higher alkyl sulphate. The hardening agent is desirably an acid, such as phosphoric acid, or formic acid or sulphuric acid or hydrochloric acid. Whilst it is essential to feed the hardening agent into the second stage at a rate sufficient to achieve gelling of the resin sufficiently rapidly, the feeding thereof or rates substantially in excess of a sufficient rate is usually undesirable.

The invention includes a method of making cellular U/F resin pellets which comprises in a first stage agitating, preferably mechanically, a mixture of liquid U/F resin, foaming agent and water in the presence of air, the duration and intensity of agitation being sufficient to produce a fine foam in which there are at least an average of $10^6$, preferably $10^7$ and more preferably $10^8$, cells per cubic centimetre, the proportions of the resin, foaming agent and water being selected to provide in the foam a maximum volume of resin amounting to 2.2% of the total volume of foam; in a second stage adding a hardening agent in an amount sufficient to harden all of said foam and mechanically agitating said foam up to a point before gelation of the resin, the intensity and duration of the continued agitation being sufficient to maintain the size of the cells on gelation and then dispersing the foamed resin into fragments substantially at the point of gelation to produce pellets. Preferably the proportion of solid per unit volume of resin in the individual pellets is not more than 4.8% and the cell size at the core of the pellets is not larger than that which corresponds to $10^6$ cells per cubic centimetre and decreases from the core towards the surface.

The present invention will be further illustrated by way of the accompanying drawings in which:

FIG. 3 is a side elevation of a section taken through the pelletizer of FIG. 1.

Figure 1:
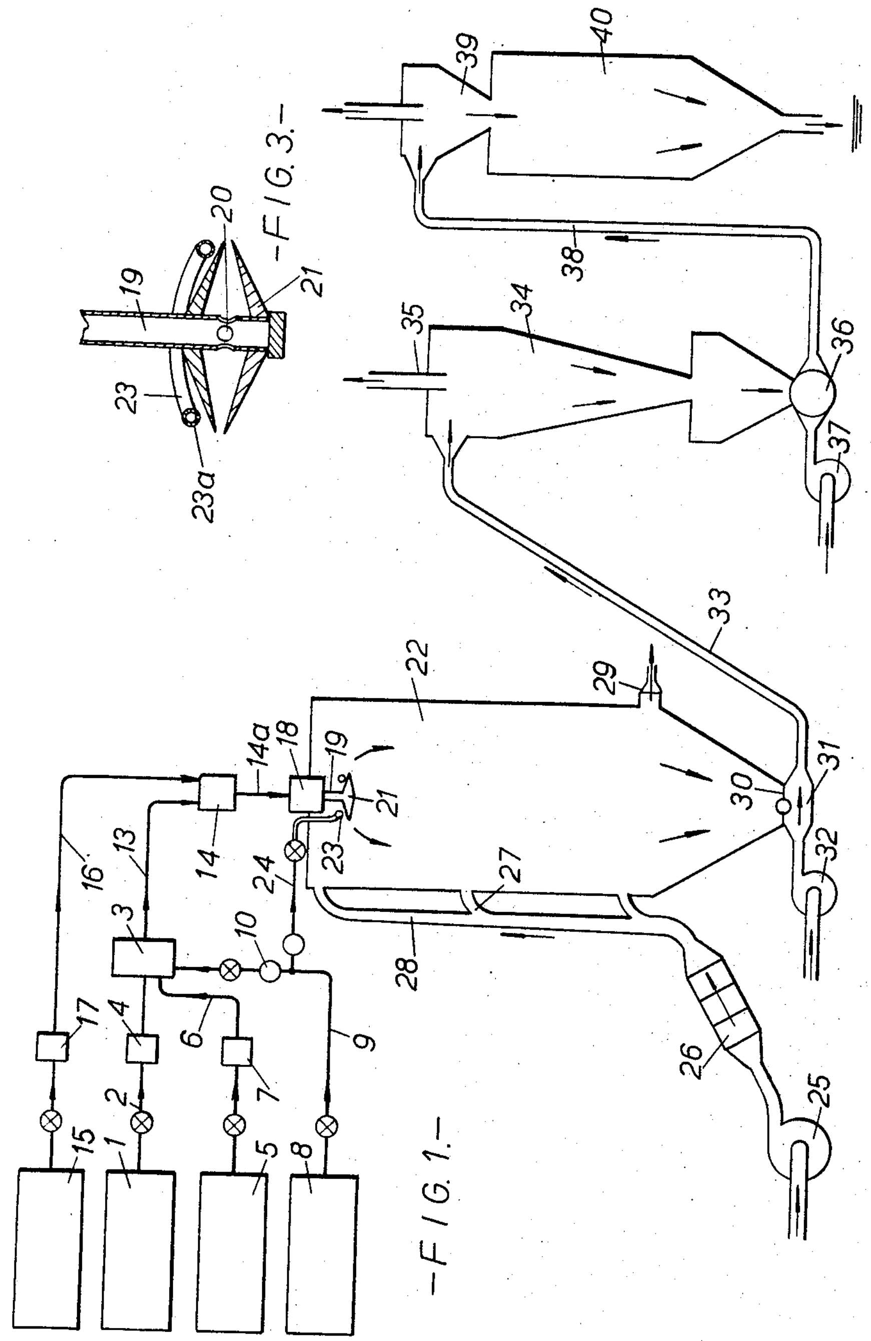
FIG. 1 is a flow diagram illustrating the process accord- to one embodiment of the present invention.

Referring to FIG. 1 an aqueous solution of U/F resin consisting of by weight 60% U/F resin and 40% water is continuously fed from a supply tank 1 through conduit 2 to a first stage rotary mixer 3 by means of a metering pump 4 at a rate of 500 grams per minute. Water containing 2% by weight Teepol (a sodium higher alkyl sulphate produced by Shell Chemical Corporation) is also continuously fed to the rotary mixer 3 from a supply tank 5 through a conduit 6 by means of metering pump 7 at a rate of 1250 cc. per minute or even so low as 400 cc. per minute. The first stage rotary mixer 3 is continuously pressurized with compressed air at 40 p.s.i.g. from a compressed air supply 8 from which it is taken at a pressure of 100 pounds per square inch gauge through conduit 9 and pressure reducing valve 10.

Figure 2:
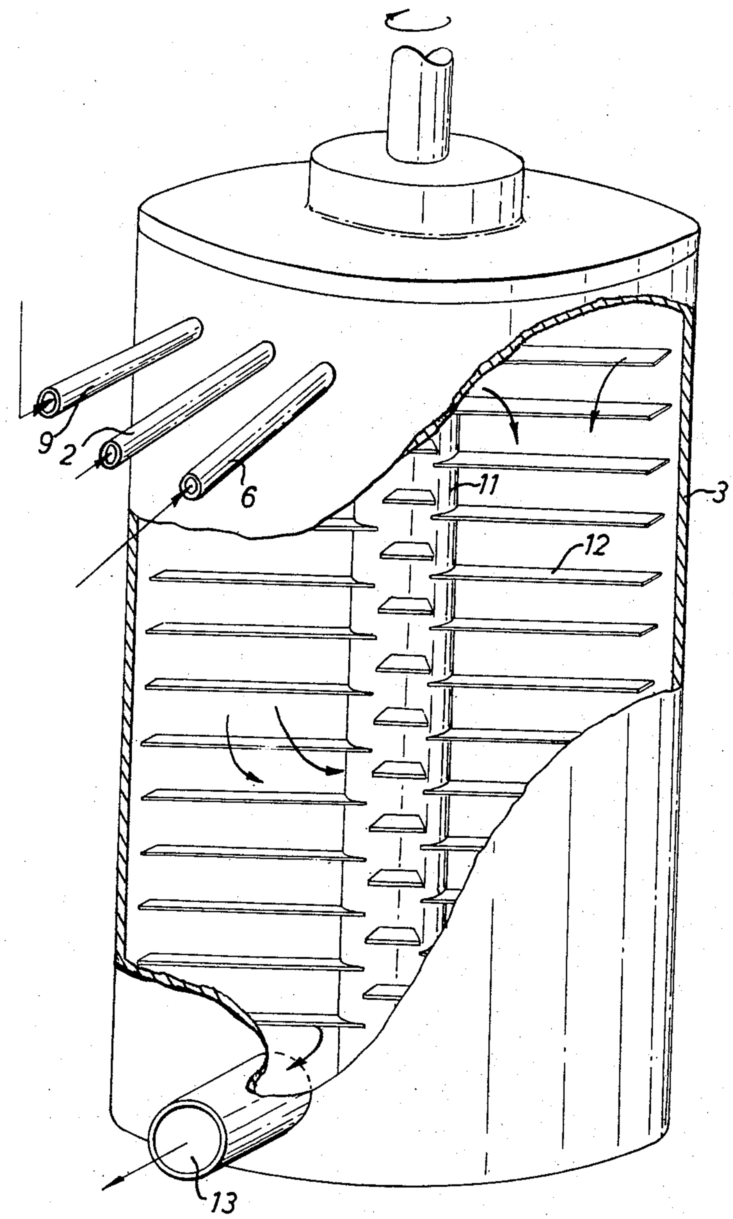
FIG.2 is a side elevation partially broken away of the first stage mixer of FIG. 1

With reference to FIG. 2 the first stage rotary mixer 3 has a shaft 11 axially rotatably mounted therein, rotating in the direction of the arrow at a rate of 4000 r.p.m. The shaft 11 has a plurality of flat blades 12 mounted thereon which blades 12 have an axial pitch of ¼" and a circumferential pitch of 90°. The aqueous solution of U/F resin, water containing Teepol and compressed air pass from conduits 2, 6, and 9 respectively into the top of the rotary mixer 3 and the mixture flows down said rotary mixer 3 whence it is beaten by the blades 12 into a fine foam of at least $10^6$ cells per cubic centimetre. This fine U/F foam leaves the first stage rotary mixer 3 through conduit 13 to a second stage rotary mixer 14. The first stage rotary mixer 3 is 4" in diameter and 24" in length or alternatively two first stage rotary mixers 12" long may be used in series.

In the second stage rotary mixer 14 the U/F foam is further beaten so as to maintain the size of the cells in the foam such that there are at least $10^6$ per cubic centimetre whilst a 2% solution of commercial phosphoric acid is continuously fed to the rotary mixer 14 from a supply tank 15 through conduit 16 by means by metering pump 17 at a rate from 250 cc. per minute to 300 cc. per minute, e.g. 285 cc. per minute, dependent upon atmospheric conditions and the condition of the resin.

In place of the phosphoric acid we may use a 0.25% solution of commercial sulphuric acid or a 1% solution of hydrochloric acid.

The second stage rotary mixer 14 is precisely the same as the first stage rotary mixer except that in this particular embodiment of the invention it is only 12" long and has in place of the conduits 2, 6 and 9 a conduit 13 for the introduction of the U/F fine foam from the first stage rotary mixer 3 and substantially diametrically opposite thereto a conduit 16 for the introduction of the aqueous phosphoric acid and in place of the exit conduit 13 an exit conduit **14*a*** is provided.

Thus the fine U/F foam enters the top of the second stage rotary mixer 14 through conduit 13 and on the opposite side but at substantially the same level phosphoric acid enters through conduit 16. The mixture passes down the rotary mixer 14 whence it is beaten by blades 12 on shaft 11 rotating at 4000 r.p.m. and exits on the point of gelation through conduit **14*a*.**

From conduit **14*a* the gelling foam enters a pelletizer where it is formed into pellets. The pelletizer and the electric motor which drives it are collectively referenced 18. With reference to FIG. 3 the pelletizer has a supply conduit 19 having holes 20 therein through which the gelling U/F foam passes to a gap between a pair of cones 21. These cones 21 rotate with conduit 19 at a rate of 5000 r.p.m. the gap between the tips of the cones being about 0.01". The centrifugal force set up by the rotation of the cones 21 forces the U/F fine foam through the gap into a drying chamber 22 in the form of pellets which are further broken up into smaller pellets by means of air jets supplied from a conduit ring 23 disposed above the cones 21 and having a plurality of holes 23*a* in the base thereof. The conduit ring 23 is supplied with air at about 100 pounds per square inch gauge through a branch conduit 24 in the conduit 9 from the compressed air supply 8.**

The drying chamber 22 is maintained at a temperature of about 300° F. by means of circulating heated air supplied from a fan 25 through a heater 26. The heated air enters the chamber 22 through a plurality of inlets 27 from a manifold 28 at a temperature of 300° F. and exists from the chamber through outlet 29 whence it is filtered and recycled to the fan 25 the heat input into the chamber 22 being regulated to maintain a constant temperature in the chamber 22 of about 250° F. to 300° F.

The pellets from the pelletizer 18 fall freely down the chamber 22 which tapers to form a flat sided trough at the bottom thereof having a butterfly valve 30 leading to a chamber 31. When the pellets reach the bottom of the chamber 22 they are dry down to approximately 10% moisture content. The butterfly valve 30 is opened at frequent intervals whence the pellets fall into the chamber 31 and are swept by an air stream from a fan 32 through a conduit 33 into a separator-cyclone 34.

In the separator-cyclone 34 the pellets settle to the bottom and the air and dust passes to the atmosphere through a conduit 35 and a filter (not shown). In the bottom of the separator 34 the pellets are forced through a rotary sieve which breaks up any large pellets present and are subsequently swept by an air stream from a fan 37 through conduit 38 into a second separator cyclone 39 where the pellets pass into a storage hopper 40 from which they can be taken when desired and the air and dust passes out through conduit 41 and a filter (not shown).

The U/F pellets produced by the process vary in size within predetermined limits the top limit being controlled by the gap between the cones 21 and is of the order of −10 mesh while the proportions of pellets having any particular size below this top limit are controlled by the air jets i.e. the greater the pressure of air the larger proportion of smaller pellets are produced.

I claim:

1. A cured cellular urea formaldehyde resin in which the walls of the cells thereof are so thin that the average bulk of solid between the cells is not greater than that which obtains when the total volume of the solid resin per unit volume of the cellular resin is 2.2% and the average number of cells per cubic centimetre is $10^6$.

2. A cured cellular urea formaldehyde resin in which the walls of the cells thereof are so thin that the average bulk of solid between the cells is not greater than that which obtains when the total volume of the solid resin per unit volume of the cellular resin is 1.1% and the average number of cells per cubic centimetre is $10^6$.

3. A cured cellular urea formaldehyde resin in which the walls of the cells thereof are so thin that the average bulk of solid between the cells is not greater than that which obtains when the total volume of the solid resin per unit volume of the cellular resin is 0.55% and the average number of cells per cubic centimetre is $10^6$.

4. A cured cellular urea formaldehyde resin in which the walls of the cells thereof are so thin that the average bulk of solid between the cells is not greater than that which obtains when the total volume of the solid resin per unit volume of the cellular resin is 0.28% and the average number of cells per cubic centimetre is $10^6$.

5. A cured cellular urea formaldehyde resin in which the walls of the cells thereof are so thin that the average bulk of solid between the cells is not greater than that which obtains when the total volume of the solid resin per unit volume of the cellular resin is 0.14% and the average number of cells per cubic centimetre is $10^6$.

6. A cured cellular urea formaldehyde resin in which the walls of the cells thereof are so thin that the average bulk of solid between the cells is not greater than that which obtains when the total volume of the solid resin per unit volume of the cellular resin is 2.2% and the average number of cells per cubic centimetre is $10^6$, said resin having at least $10^6$ cells per cubic centimetre.

7. A cured cellular urea formaldehyde resin in which the walls of the cells thereof are so thin that the average bulk of solid between the cells is not greater than that which obtains when the total volume of the solid resin per unit volume of the cellular resin is 1.1% and the average number of cells per cubic centimetre is $10^6$, said cellular resin having at least $10^6$ cells per cubic centimetre.

8. A cured cellular urea formaldehyde resin in which the walls of the cells thereof are so thin that the average bulk of solid between the cells is not greater than that which obtains when the total volume of the solid resin per unit volume of the cellular resin is 1.1% and the average number of cells per cubic centimetre is $10^6$, said cellular resin having at least $10^7$ cells per cubic centimetre.

9. An essentially non-porous pellet formed from a cellular urea-formaldehyde resin in which the average bulk of solid between the cells is not greater than that which obtains when the total volume of the solid resin per unit volume of the cellular resin is 2.2% and the average number of cells per cubic centrimetre is $10^6$, the cells of the exterior portion of said pellet have an essentially closed cell structure and have a smaller cell size than the cells of the interior portions thereof.

10. An essentially non-porous pellet formed from a cellular urea formaldehyde resin in which the average bulk of solid between the cells is not greater than that which obtains when the total volume of the solid resin per unit volume of the cellular resin is 0.55% and the average number of cells per cubic centimetre is $10^6$, the cells of exterior portion of said pellet having an essentially closed cell structure and have a smaller cell size than the cells of the interior portions thereof.

11. An essentially non-porous pellet formed from a cellular urea-formaldehyde resin in which the average bulk of solid between the cells is not greater than that which obtains when the total volume of the solid resin per unit volume of the cellular resin is 1.1% and the average number of cells per cubic centimetre is $10^6$, the cells on the exterior portion of which have an essentially closed cell structure and have a smaller size than the cells of the interior portions thereof, the size of the exterior cells being such that there is an average of at least $10^8$ cells per cubic centimetre.

12. An essentially non-porous pellet formed from a cellular urea formaldehyde resin in which the average bulk of solid between the cells is not greater than that which obtains when the total volume of the solid resin per unit volume of the cellular resin is 1.1% and the average number of cells per cubic centimetre is $10^6$, the cells on the exterior portion of which have an essentially closed cell structure and have a smaller cell size than the cells of the interior portions thereof, there being at least $10^6$ cells per cubic centimetre in the core thereof and an average of at least $10^7$ cells per cubic centimetre in the exterior portion.

13. An essentially non-porous pellet formed from a cellular urea formaldehyde resin in which the average bulk of solid between the cells is not greater than that which obtains when the total volume of the solid resin per unit volume of the cellular resin is 1.1% and the average number of cells per cubic centimetre is $10^6$, the cells on the exterior portion of which have an essentially closed cell structure and have a smaller cell size than the cells of the interior portions thereof, there being an average of at least $10^9$ cells per cubic centimetre in the exterior portion.

14. An essentially non-porous pellet formed from a cellular urea formaldehyde resin in which the proportion of solid resin per unit volume of cellular resin in the pellet is not more than 4.8% and in which the cell size at the core of the pellet is not larger than that which corresponds to $10^6$ cells per cubic centimetre and decreases from the core towards the surface.

15. A method of making a cellular urea formaldehyde resin which comprises in a first stage agitating a mixture of urea formaldehyde resin, foaming agent and water in the presence of air, the duration and intensity of agitation being sufficient to produce a fine foam in which there is at least an average of $10^4$ cells per cubic centimetre, the proportions of the resin, foaming agent and water being gauged to provide an average bulk of solid between the cells not greater than that which obtains with the total volume of solid resin per unit volume of cellular resin is 2.2% and the average number of cells per cubic centimetre is $10^6$, in a second stage adding a hardening agent in an amount sufficient to harden all of said fine foam and continuing to agitate said fine foam up to a point before gelation of the resin, the intensity and duration of the continued agitation being sufficient to maintain the size of the cells on gelation, the foam being discharged from the second stage and formed into pellets by subjecting it at the point of gelation to centrifugal action which breaks up the foam into pellets which then harden.

16. A method of making cellular urea formaldehyde resin which comprises in a first stage agitating a mixture of urea formaldehyde resin, foaming agent and water in the presence of air, the duration and intensity of agitation being sufficient to produce a fine foam in which there is at least an average of $10^4$ cells per cubic centimetre, the proportions of the resin, foaming agent and water being gauged to provide an average bulk of solid between the cells not greater than that which obtains with the total volume of solid resin per unit volume of cellular resin is 2.2% and the average number of cells per cubic centimetre is $10^6$, in a second stage adding a hardening agent in an amount sufficient to harden all of said fine foam and continuing to agitate said fine foam up to a point before gelation of the resin, the intensity and duration of the continued agitation being sufficient to maintain the size of the cells on gelation, the foam being discharged from the second stage and formed into pellets by subjecting it at the point of gelation to impact with a gas which breaks up the foam into pellets which then harden.

17. A process for the production of a cellular urea formaldehyde resin pellet which comprises in a first stage agitating a mixture of liquid urea formaldehyde resin, foaming agent and water in the presence of air, the duration and intensity of agitation being sufficient to produce a fine foam in which there are at least an average of $10^5$ cells per cubic centimetre, the proportions of the resin, foaming agent and water being selected to provide in the foam a maximum volume of resin amounting to 2.2% of the total volume of foam, in a second stage adding a hardening agent in an amount sufficient to harden all of said foam and continuing to agitate said foam up to a point before gelation of the resin, the intensity and duration of the continued agitation being sufficient to maintain the size of the cells on gelation and then dispersing the foamed resin into fragments substantially at the point of gelation to produce pellets in which the proportion of solid per unit volume of the individual pellets is not more than 4.4% and in which the cell size at the core of the pellets is not larger than that which corresponds to $10^6$ cells per cubic centimetre and decreases from the core towards the surface.

18. A process according to claim 17 in the fine foam produced in the first stage has at least $10^6$ cells per cubic centimetre.

19. A process according to claim 17 in which the foam produced in the first stage has at least $10^7$ cells to the cubic centimetre.

20. A method of making a cellular urea formaldehyde resin which comprises in a first stage agitating a mixture of urea formaldehyde resin, foaming agent and water in the presence of air, the duration and intensity of agitation being sufficient to produce a fine foam in which there is at least an average of $10^4$ cells per cubic centimetre, the proportions of the resin, foaming agent and water being gauged to provide an average bulk of solid between the cells not greater than that which obtains with the total volume of solid resin per unit volume of cellular resin is 2.2% and the average number of cells per cubic centimetre is $10^6$, in a second stage adding a hardening agent in an amount sufficient to harden all of said fine foam and continuing to agitate said fine foam up to a point before gelation of the resin, the intensity and duration of the continued agitation being sufficient to maintain the size of the cells on gelation, the foam being discharged from the second stage and formed into pellets by subjecting the foam at the point of gelation to centrifugal action and impact with a gas which break up the foam into pellets which then harden.

References Cited

UNITED STATES PATENTS

| | | | |
|---|---|---|---|
| 2,813,780 | 11/1957 | Vieli | 260—2.5 |
| 3,063,952 | 11/1962 | Vieli | 260—2.5 |
| 3,150,108 | 9/1964 | Vieli | 260—2.5 |
| 3,164,559 | 1/1965 | Eberl | 260—2.5 |
| 3,189,479 | 6/1965 | Coppick et al. | 260—2.5 |

SAMUEL H. BLECH, *Primary Examiner.*

MURRAY TILLMAN, *Examiner.*

N. F. OBLON, R. B. TURER, *Assistant Examiners.*